March 3, 1931.  M. J. BELCHER  1,794,436
COMBINATION COOKER AND FREEZER
Filed Dec. 6, 1929
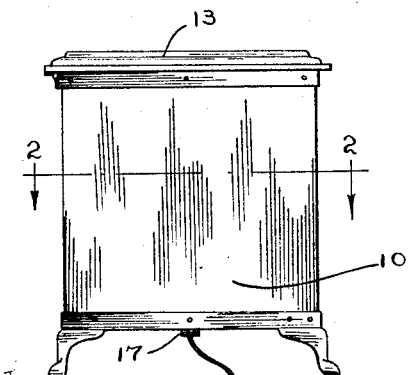
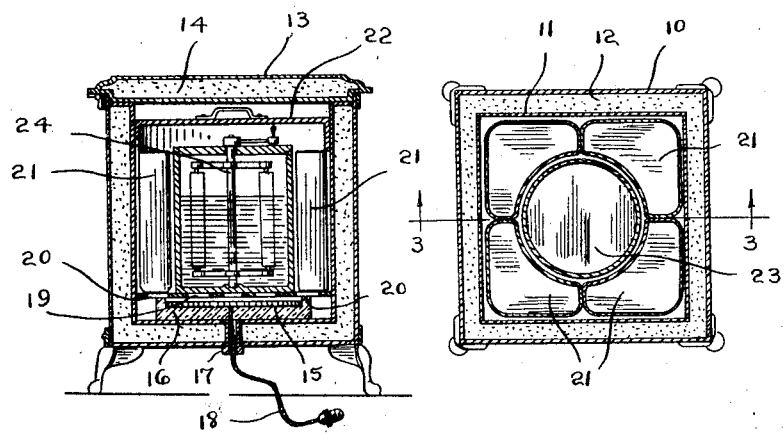
INVENTOR
Mary J. Belcher
By Ralph Burch
Attorney Patented Mar. 3, 1931

1,794,436

UNITED STATES PATENT OFFICE

MARY JANE BELCHER, OF WALKERVILLE, ONTARIO, CANADA

COMBINATION COOKER AND FREEZER

Application filed December 6, 1929. Serial No. 412,181.

This invention relates to improvements in a combination cooker and freezer. Its primary object is to provide a device that may be used to cook meat, vegetables, pudding and to boil water all at the same time using an electrical heating element as the source of heat, or it may be used as a freezer by filling a receptacle with ice provided for the same thus keeping the contents of the other receptacles cold.

A further object is to provide such a device that is compact and inexpensive to manufacture.

With these and other objects in view as will appear as the description proceeds, the invention consists in the novel construction and arrangement of parts as hereinafter more specifically set forth, claimed and shown in the accompanying drawings forming a part of this present application and in which—

Fig. 1 is a front elevation of the invention.

Fig. 2 is a cross-section on the line 2—2 of Fig. 1.

Fig. 3 is a cross-section on the line 3—3 of Fig. 2.

Referring more in detail to the drawings in which similar reference characters designate corresponding parts throughout the several views it will be seen that the invention comprises an outer casing 10 having an inner casing 11 secured thereto, and the intervening space 12 between the said casings filled with a non-conduction material such as asbestos or the like. A cover 13 is provided for the device. This also is constructed with a space 14 for the non-conducting packing. In the bottom of the inner casing 11 is located the heating element 15 on its support 16, a porcelain conduit tube 17 being provided to conduct the electric cord 18 through the casings and the packing.

A perforated plate 19 is placed over the heating element 15 being held up from the same by the shoulder 20 on the support 16. Four metal receptacles 21 are provided to contain the articles of food which are to be either cooked or frozen. These receptacles are shaped as shown to form a circular hollow center. 22 shows an inner lid which fits over these four receptacles and the hollow center thus confining the heat to these said receptacles and their contents.

As now described the invention is complete for use as a cooker. When it is desired to use the device as a freezer a receptacle 23 is placed in the center between the previously mentioned receptacles 21. It is obvious that the ice may be placed either in the outer receptacle 21 or in the inner receptacle 23 depending upon whether a large number of articles are to be kept cool or a smaller number. 24 shows an ice cream freezer placed in the inner receptacle. When this is used the ice will be placed in the outer receptacles 21.

It is believed that the construction and advantages of the structure shown may be apparent from the foregoing paragraphs taken in connection with the accompanying drawings without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:—

A device of the character described comprising an insulated heating chamber having a removable airtight cover, an electric heating element, a support mounted centrally in the bottom of said chamber adapted to support said heating element, said support having an upstanding flange surrounding the heating element, a perforated plate supported by said flange in spaced relation to said heating element, a plurality of food receptacles supported by said plate, said receptacles being arranged circumferentially around the center of the plate providing a central heat circulating space and an inner cover for said food receptacles disposed in spaced relation to the tops of the receptacles.

In testimony whereof I affix my signature.

MARY JANE BELCHER.